United States Patent
Matei et al.

(10) Patent No.: US 10,977,110 B2
(45) Date of Patent: Apr. 13, 2021

(54) SYSTEM AND METHOD FOR FACILITATING PREDICTION DATA FOR DEVICE BASED ON SYNTHETIC DATA WITH UNCERTAINTIES

(71) Applicant: Palo Alto Research Center Incorporated, Palo Alto, CA (US)

(72) Inventors: Ion Matei, Sunnyvale, CA (US); Rajinderjeet S. Minhas, Palo Alto, CA (US); Johan de Kleer, Los Altos, CA (US); Anurag Ganguli, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 219 days.

(21) Appl. No.: 15/855,560

(22) Filed: Dec. 27, 2017

(65) Prior Publication Data

US 2019/0196892 A1 Jun. 27, 2019

(51) Int. Cl.
*G06F 11/00* (2006.01)
*G06F 11/07* (2006.01)
*G06N 5/04* (2006.01)
*G06N 20/00* (2019.01)
(Continued)

(52) U.S. Cl.
CPC ........ *G06F 11/079* (2013.01); *G06F 11/0721* (2013.01); *G06N 5/003* (2013.01); *G06N 5/048* (2013.01); *G06N 7/005* (2013.01); *G06N 20/00* (2019.01)

(58) Field of Classification Search
CPC . G06F 11/3447; G06F 11/3452; G06B 17/02; G06B 17/5009; G06B 17/5022; G06B 11/5009
See application file for complete search history.

(56) References Cited

U.S. PATENT DOCUMENTS

| 9,347,314 B2* | 5/2016 | Indo ...................... E21B 49/088 |
| 9,349,178 B1* | 5/2016 | Itu .......................... G16H 50/50 |
| 2001/0049690 A1* | 12/2001 | McConnell .......... G06Q 10/087 |

(Continued)

OTHER PUBLICATIONS

Tyson, "Uncertainty Modelling with Polynomial Chaos Expansion", Nov. 24, 2015, University of Queensland, pp. 1-32 (Year: 2015).*

(Continued)

*Primary Examiner* — Bryce P Bonzo
*Assistant Examiner* — Jeison C Arcos
(74) *Attorney, Agent, or Firm* — Shun Yao; Park, Vaughan, Fleming & Dowler LLP

(57) ABSTRACT

Embodiments described herein provide a system for facilitating a training system for a device. During operation, the system determines a system model for the device that can be based on empirical data of the device. The empirical data is obtained based on experiments performed on the device. The system then generates, from the system model, synthetic data that represents behavior of the device under a failure. The system determines uncertainty associated with the synthetic data and, from the uncertainty, determines a set of prediction parameters using an uncertainty quantification model. The system generates training data from the synthetic data based on the set of prediction parameters and learns a set of learned parameters associated with the device by using a machine-learning-based classifier on the training data.

20 Claims, 13 Drawing Sheets

(51) Int. Cl.
*G06N 5/00* (2006.01)
*G06N 7/00* (2006.01)

(56) References Cited

U.S. PATENT DOCUMENTS

| | | | | |
|---|---|---|---|---|
| 2004/0102937 | A1* | 5/2004 | Ibrahim | G05B 13/048 703/2 |
| 2005/0004833 | A1* | 1/2005 | McRae | G05B 17/02 703/2 |
| 2008/0215925 | A1* | 9/2008 | Degenaro | G06F 11/263 714/41 |
| 2010/0017092 | A1* | 1/2010 | Butler | F01D 21/003 701/100 |
| 2012/0030154 | A1* | 2/2012 | Nicholson | G01S 7/003 706/12 |
| 2014/0258187 | A1* | 9/2014 | Suleiman | G06N 20/00 706/12 |
| 2015/0058388 | A1* | 2/2015 | Smigelski | G06F 17/141 708/208 |
| 2015/0226049 | A1* | 8/2015 | Frangos | E21B 44/00 702/6 |
| 2017/0047086 | A1* | 2/2017 | Usui | G11B 19/041 |
| 2019/0197435 | A1* | 6/2019 | Kobayashi | G06N 5/022 |

OTHER PUBLICATIONS

Peng, "Uncertainty Quantification via Sparse Polynomial Chaos Expansion", Jan. 1, 2015, University of Colorado, Boulder, pp. 1-178 (Year: 2015).*

Iskandarani "Tutorial on Uncertainty Quantification with Emphasis on Polynomial Chaos Methods", Oct. 3, 2013, MIT, pp. 1-61 (Year: 2013).*

Zhang, "Uncertainty quantification in CO2 sequestration using surrogate models from polynomial chaos expansion" Jun. 2012, Carnegie Mellon University, pp. 1-35 (Year: 2012).*

Sepahvand, "Uncertainty Quantification in Stochastic Systems Using Polynomial Chaos Expansion", Jan. 20, 2010, International Journal of Applied Mechanics, vol. 2, No. 2, pp. 1-50 (Year: 2010).*

Paffrath, "Adapted polynomial chaos expansion for failure detection" Apr. 24, 2007, Science Direct, pp. 263-281 (Year: 2007).*

* cited by examiner

US 10,977,110 B2

SYSTEM AND METHOD FOR FACILITATING PREDICTION DATA FOR DEVICE BASED ON SYNTHETIC DATA WITH UNCERTAINTIES

BACKGROUND

Field

This disclosure is generally related to prognosis of a system. More specifically, this disclosure is related to a method and system for facilitating an efficient prognostic system for a device based on synthetic data with uncertainty.

Related Art

With the advancement of computer and network technologies, various operations performed by users of different applications have led to extensive use of data processing. Such data processing techniques have been extended to the analysis of a large amount of empirical data associated with a device to determine behaviors of the device. This proliferation of data continues to create a vast amount of digital content. In addition, scientific explorations continue to demand more data processing in a short amount of time. This rise of big data has brought many challenges and opportunities. Recent heterogeneous high performance computing architectures offer viable platforms for addressing the computational challenges of mining and learning with device data. As a result, device data processing is becoming increasingly important with applications in machine learning and use of machine learning for device operations.

Learning models of the device or learning policies for optimizing an operation of the device relies on potentially large training data sets that describe the behavior of the device. When such training data sets are incomplete or unavailable, an alternative is to supplement the training data set. Such alternatives may include generating simulation data, if an analytical model of the device is available, or executing experiments on the device. However, to build a model representing the physical behavior of the device (e.g., a physics-based model), information about the physical processes that govern the behavior of the device is needed. Unfortunately, a model may not represent such behavior completely or precisely. As a result, such a model is typically an approximation, and the supplemented data can include uncertainty. For example, the model can only provide a range of parameters instead of a specific parameter representing a specific behavior.

While analyzing device data, which can include experimental or empirical data, brings many desirable features to device operations, some issues remain unsolved in efficiently generating and analyzing extensive prediction data for diagnosis and prognosis for the device.

SUMMARY

Embodiments described herein provide a system for facilitating a training system for a device. During operation, the system determines a system model for the device that can be based on empirical data of the device. The empirical data is obtained based on experiments performed on the device. The system then generates, from the system model, synthetic data that represents behavior of the device under a failure. The system determines uncertainty associated with the synthetic data and, from the uncertainty, determines a set of prediction parameters using an uncertainty quantification model. The system generates training data from the synthetic data based on the set of prediction parameters and learns a set of learned (or output) parameters associated with the device by using a machine-learning-based classifier or a regression model on the training data.

In a variation on this embodiment, the uncertainty quantification model is based on generalized Polynomial Chaos (gPC) expansion.

In a variation on this embodiment, the machine-learning-based classifier is based on one or more of: (i) an optimization of a set of input parameters to the system model; and (ii) a state estimation of the set of input parameters to the system model.

In a further variation, the state estimation is based on a regression model using one or more of: a Kalman filter, an extended Kalman filter, and a particle filter.

In a variation on this embodiment, the set of prediction parameters mitigates the uncertainty in the synthetic data by reducing computation overhead.

In a further variation, the system determines a mode of operation that represents the failure of the device and determines the prediction parameters associated with the mode of operation.

In a variation on this embodiment, the system determines prognosis information of the device from the set of learned parameters. The system also determines a prognosis policy for the device based on the prognosis information.

In a variation on this embodiment, the system determines a current environment for the device. The current environment corresponds to the failure of the device. The system then determines an operation corresponding to the current environment based on the set of learned parameters.

BRIEF DESCRIPTION OF THE FIGURES

In the figures, like reference numerals refer to the same figure elements.

DETAILED DESCRIPTION

Figure 1A:
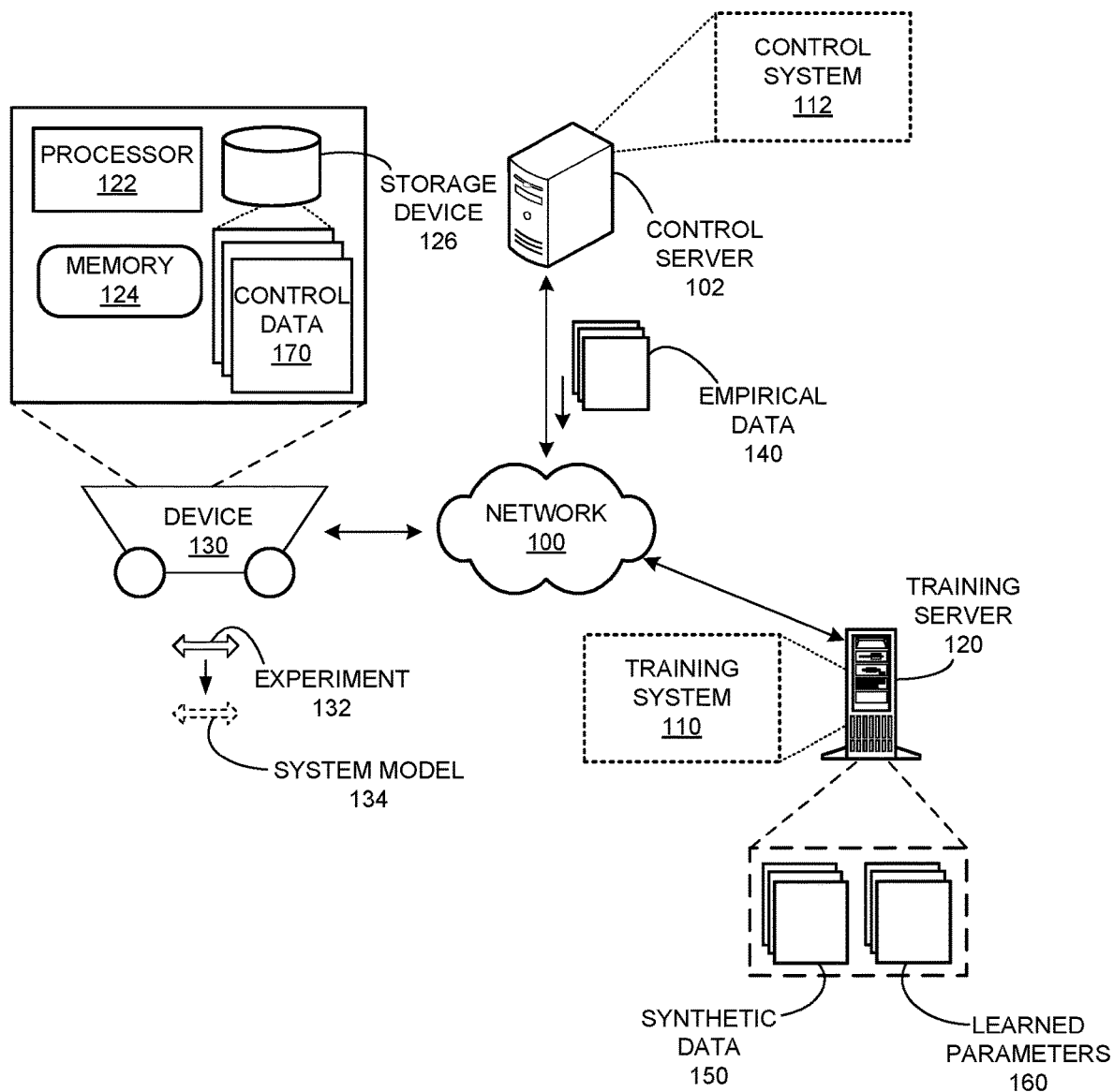
FIG. 1A illustrates an exemplary training system using synthetic data with uncertainty, in accordance with an embodiment described herein.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

Embodiments described herein solve the problem of efficiently determining prediction data for diagnosis and prognosis from synthetic data with uncertainty by mitigating the uncertainty using a quantification model with the system model generating the synthetic data.

Typically, how a device (e.g., an electro-mechanical device) may behave in various failure scenarios may not be known. With existing technologies, a system model representing the behavior of the device can be used to determine the failure behavior. The system model can apply a set of system parameters to generate a corresponding set of outputs, which can be included in synthetic data for the device. For example, the system model can accept a set of system parameters that may represent a failure of the device and generate a set of outputs that are sensitive to the set of parameters. In this way, the system model can be applied to different sets of system parameters to generate synthetic data for the device.

However, the system model typically includes simplifying assumptions about the device that result in both structural and parametric uncertainties. As a result, the synthetic data is also affected by model-induced uncertainties. For example, to determine a scenario under which a device may fail, the system model may provide a range of parameters for which the failure may occur. If a machine-learning (ML) based classifier is used for prognosis of the device, the uncertainty can propagate to the corresponding training (i.e., training from the classifier). Another source of uncertainty can be fault augmentation into a system model. The system model may require extensive computation (e.g., a brute-force approach, such as a Monte-Carlo method) to determine all possible outputs associated with the uncertainty, leading to significant inefficiency of the classifier training.

To solve this problem, embodiments described herein provide a training system that can efficiently generate synthetic data by determining specificity associated with the uncertainty introduced by the system model. The system can use an ML-based classifier for determining device behavior in failure scenarios. The system determines the uncertainty associated with the system model. To do so, the system may determine a range of system parameters associated with the uncertainty (e.g., the range of parameters for which the device may fail). This range of parameters can be represented by a probability distribution of the system parameters. The system then determines a set of prediction parameters from the range of parameters based on an uncertainty quantification model. This set of prediction parameters can be an approximation of the representation of the uncertainty and may represent the critical parameters in the range of parameters. The system then evaluates the system model at the set of parameters to generate synthetic data comprising the corresponding outputs. In this way, the system mitigates the uncertainty of synthetic data generation by reducing computation overhead, thereby ensuring increased efficiency of the classifier. The system may also generate control data that indicates how to control the device under the failure scenario.

Although the instant disclosure is presented using examples based on learning-based data mining on empirical and derived data, embodiments described herein are not limited to learning-based computations or a type of a data set. Embodiments described herein can also be applied to any learning-based data analysis. In this disclosure, the term "learning" is used in a generic sense, and can refer to any inference techniques derived from feature extraction from a data set.

The term "message" refers to a group of bits that can be transported together across a network. "Message" should not be interpreted as limiting embodiments of the present invention to any networking layer. "Message" can be replaced by other terminologies referring to a group of bits, such as "packet," "frame," "cell," or "datagram."

Prediction System

FIG. 1A illustrates an exemplary training system using synthetic data with uncertainty, in accordance with an embodiment described herein. In this example, a device 130 can be any electric or mechanical device that can be controlled based on instructions issued from a control system 112. In this example, control system 112 operates on a control server 102 and communicates with device 130 via a network 100. Each of device 130 and control server 102 can be equipped with one or more communication devices, such as interface cards capable of communicating via a wired or wireless connection. Examples of an interface card include, but are not limited to, an Ethernet card, a wireless local area network (WLAN) interface (e.g., based on The Institute of Electrical and Electronics Engineers (IEEE) 802.11), and a cellular interface. Control system 112 can also operate on device 130.

For example, device 130 can also be equipped with a memory 124 that stores instructions that when executed by a processor 122 of device 130 cause processor 122 to perform instructions for operating device 130. These instructions can allow automation of device 130. Control system 112 can learn a policy that performs prognostic (or diagnostic) operations of device 130. To do so, control system 112 relies on data sets that describe the behavior of device 130. Such data should be reliable and comprehensive, so that control system 112 can issue instructions to device 130 in a way that allows control system 112 to control device 130 to reach a goal in an efficient way.

With existing technologies, such a data set can be generated through simulations or experiments. During operation, an experiment 132 can be performed on device 130 based on an instruction from control system 112. This instruction can be generated by control system 112 or provided by an operator of device 130. Control system 112 obtains empirical data 140 generated from experiment 132. For example, if device 130 is a quadcopter, experiment 132 can include the forward movement of device 130. The corresponding empirical data 140 can include the rotation of each of the rotors of device 130 and the corresponding velocity of device 130.

Based on empirical data 140, a system model 134 can be developed that represents the behavior of device 130. This behavior indicates how device 130 operates (i.e., an output) for one or more actions performed on device 130 (i.e., an input or a parameter). Since experiment 132 may include typical and regular operation of device 130 (e.g., not including failure of device 130), system model 134 can be used to determine the failure behaviors of device 130.

To do so, a training system 110 can utilize system mode 134. Training system 110 can operate on a training server 120, which can be coupled to control server 102 via network 100. It should be noted that training server 120 and control server 102 can be the same physical machine. Furthermore, training system 110 can run on device 130 as well. Training system 110 determines whether any property of device 130 can be applied to system model 134 to derive synthetic data representing failure behavior. For example, training system 110 generates synthetic data 150 based on the system model. System model 134 can accept a set of parameters that may represent a failure of device 130 and generate a set of outputs corresponding to the set of parameters (e.g., generate simulation data that includes simulated output). In this way, system model 134 can be applied to different sets of parameters to generate synthetic data 150 for the device. It should be noted that synthetic data 150 can include both regular and failure behavior of device 130.

However, system model 134 typically includes simplifying assumptions about device 130 that result in both structural and parametric uncertainties. As a result, synthetic data 150 is also affected by the model-induced uncertainties. For example, to determine a scenario under which device 130 may fail, system model 134 may provide a range of parameters for which the failure may occur. If an ML-based classifier is used for the prognosis of device 130, the uncertainty can propagate to the corresponding training data (i.e., training data for the classifier). Classifier training may require extensive computation, such as a brute-force approach, to determine all possible outputs associated with the uncertainty, leading to significant inefficiency of the classifier training.

To solve this problem, training system 110 can efficiently generate synthetic data 150 by determining specificity associated with the uncertainty introduced by system model 134. System 110 can use an ML-based classifier for determining the behavior of device 130 in failure scenarios. System 110 can determine learned parameters 160 during the classifier training. Learned parameters 160 represent the training of device 130 via the classifier. During operation, system 110 determines the uncertainty associated with system model 134. This uncertainty can be from the specifications (e.g., resistors in a device may correspond to different precision classes) or the modeling process of system model 134. To do so, system 110 may determine a range of parameters associated with the uncertainty (e.g., the range of parameters for which device 130 may fail).

System 110 then determines a set of parameters from the range of parameters based on an uncertainty quantification model. Examples of the uncertainty quantification model include, but are not limited to, generalized Polynomial Chaos (gPC) and Monte-Carlo simulations. This set of parameters represents the critical parameters in the range of parameters and is usually significantly smaller in size than the range of parameters. System 110 then evaluates system model 134 at the set of parameters to generate synthetic data 150 comprising the corresponding outputs. In this way, system 110 mitigates the uncertainty of synthetic data 150 by reducing computation overhead and ensures increased accuracy of learned parameters 160.

In some embodiments, system 110 may also generate control data 170 that indicates how to control device 130 under the failure scenario using learned parameters 160. System 110 can provide control data 170 to control server 102. Providing control data 170 can include generating a message destined to control server 102, including control data 170 in the message, determining an egress port for the message, and transmitting the message via the egress port. Control system 112 can use control data 170 to control device 130 under the failure scenarios. Control system 112 can also provide control data 170 to device 130, which can store control data 170 in a local storage device 126. Device 130 can then use control data 170 to automate the operations of device 130 under the failure scenarios.

Uncertainty Quantification

Figure 1B:
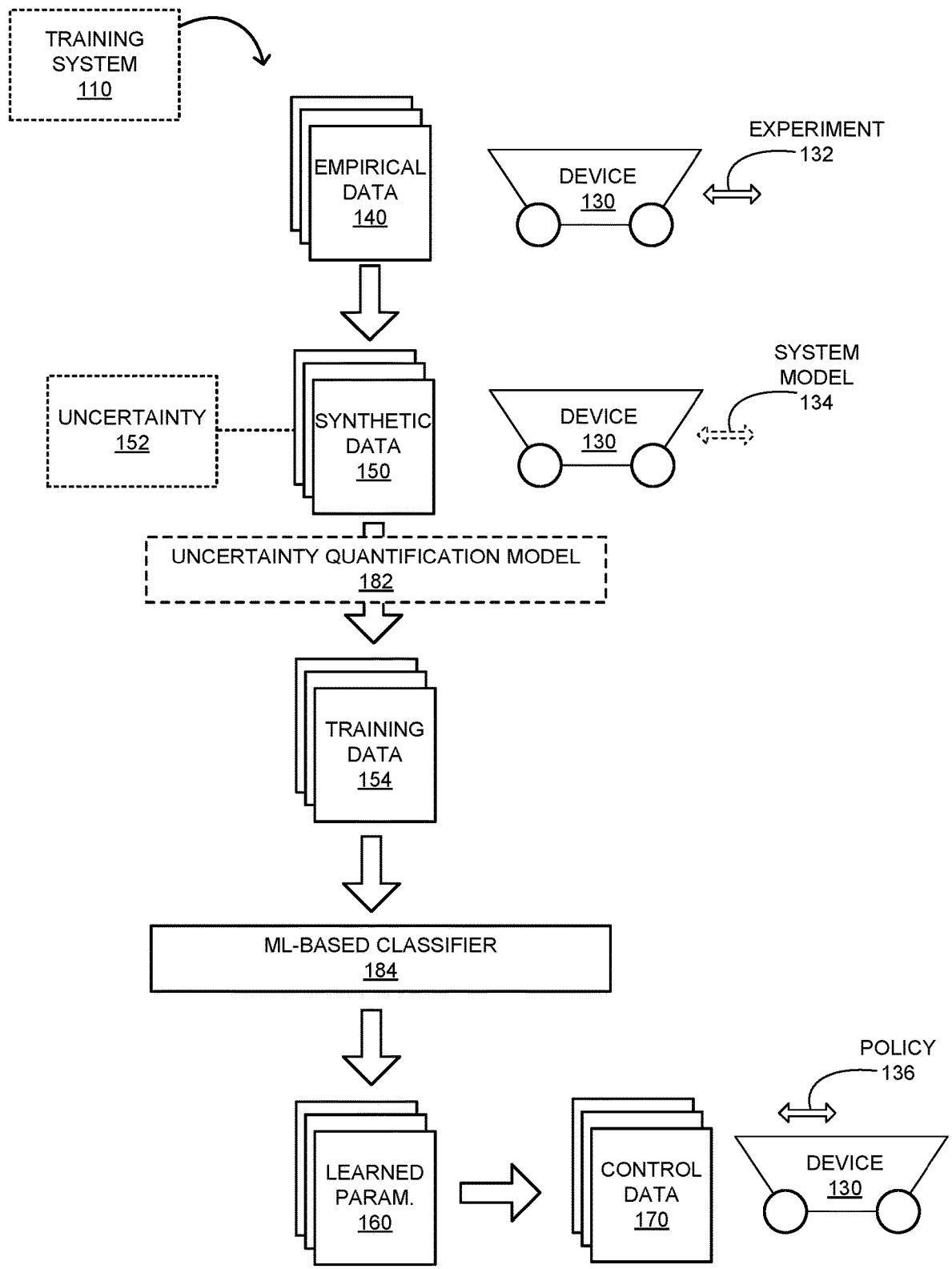
FIG. 1B illustrates an exemplary uncertainty quantification model mitigating the uncertainty of synthetic data, in accordance with an embodiment described herein.

FIG. 1B illustrates an exemplary uncertainty quantification model mitigating the uncertainty of synthetic data, in accordance with an embodiment described herein. In this example, an experiment 132 performed on device 130 generates empirical data 140. This empirical data 140 is provided to system 110, which applies one or more properties of device 130, which can be based on the system specifications, to empirical data 140 to generate a system model 134. For example, if experiment 132 indicates how device 130 travels from right to left, the symmetry property of device 130 allows system 110 to determine system model 134, which that indicates how device 130 travels from left to right.

System 110 can use learned parameters 160 as the parameters of the prediction model (e.g., ML-based classifier 184). For example, system 110 can use optimization-based techniques to solve a minimum-variance problem. System 110 can also interpret the set of parameters as states of the prediction model (e.g., ML-based classifier 184). For both approaches, system 110 uses an uncertainty quantification model 182 to represent uncertainty 152 in synthetic data 150. System 110 determines how the uncertainty in system model 134 is mapped to uncertainty 152 in synthetic data 150 and uses uncertainty quantification model 182 to reduce the numerical complexity in both approaches. In this way, uncertainty quantification model 182 mitigates uncertainty 152 in synthetic data 150 to generate training data 154.

For the first approach, uncertainty quantification model 182 can enable efficient evaluation of the cost function (e.g., using Gauss quadrature algorithms). For the second approach, uncertainty quantification model 182 can provide simplified sensing model representation in the state-space model of a filter associated with the state estimation. Both approaches may rely on evaluation of system model 134. Since uncertainty quantification model 182 facilitates critical data points associated with the uncertainty, the complexity of computation of system model 134 is significantly reduced.

In some embodiments, system 110 can also generate control data 170 that indicates how to control device 130 under the failure scenario using learned parameters 160.

System 110 can determine an efficient policy 136 of how to control device 130. Policy 136 can indicate how device 130 can efficiently operate under one or more failure scenarios. In some embodiments, policy 136 determines which operation should be most beneficial to device 130 for a current state. For example, if the current state of device 130 represents a diagnostic issue of device 130, policy 136 can indicate which state device 130 should transition to that may resolve the issue.

Figure 1C:
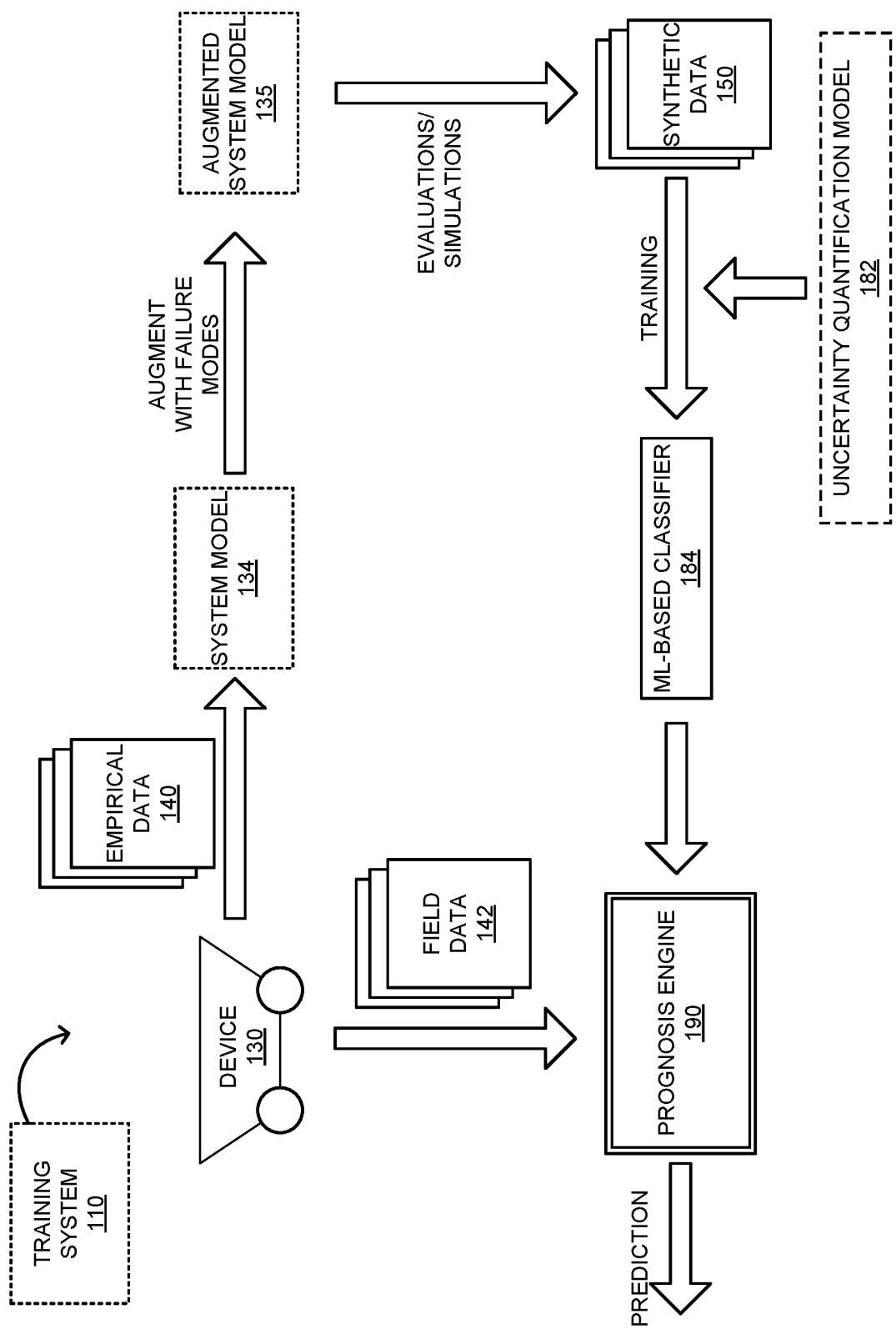
FIG. 1C illustrates an exemplary prognosis engine based on synthetic data with uncertainty, in accordance with an embodiment described herein.

FIG. 1C illustrates an exemplary prognosis engine based on synthetic data with uncertainty, in accordance with an embodiment described herein. In this example, based on empirical data 140 of device 130, a system model 134 can be generated. To ensure system model 134 can represent failure scenarios for device 130, training system 110 can determine one or more modes of operations representing failure scenarios (i.e., failure modes) for device 130. System model 134 can be augmented to incorporate the failure modes, thereby deriving an augmented system model 135, which can represent the failure scenarios of device 130. By evaluating/simulating system model 135, training system 110 can generate synthetic data 150.

Since system model 135 can include uncertainty due the behavior of device 130 or the augmentation process, synthetic data 150 can include uncertainty as well. It should be noted that uncertainty associated with the augmentation process may derive from the approximations of system model 135 (i.e., system model 135 may not exactly represent the failure modes of device 130). Training system 110 then uses uncertainty quantification model 182 to express uncertainty in synthetic data 150 (e.g., using optimization methods or filters) and train a ML-based classifier 184 while accounting for the uncertainty. This ML-based classifier 184 can operate as the prediction model.

This training process allows ML-based classifier 184 to learn parameters that can represent the failure scenarios for device 130, thereby creating a prognosis engine 190. Prognosis engine 190 can obtain field data 142 of device 130 and provide predictions for device 130. Field data 142 can include operational data of device 130 when device 130 is deployed in the field (i.e., in practical/real world operations). The predictions from prognosis engine 190 can be diagnosis and prognosis information of device 130.

Synthetic Data Generation

In the example in FIG. 1B, training data 154, which includes input features (or inputs) and corresponding outputs, used for training ML-based classifier 184 is based on system model 134 representing the behavior of device 130. If $\mathcal{D}=\{(x_k, y_k)\}$ denotes synthetic data 150, an approach of generating $\mathcal{D}$ can be computing a feature input-output pair $(x_k, y_k)$ over a time window of size T. A respective input $x_k$ can be in a feature vector X. By sliding this window over different sets of input for device 130, system 110 can generate corresponding outputs. In this way, system 110 can produce synthetic data 150, which is a set of input features and corresponding outputs, which encodes the behavior of device 130 over time.

It should be noted that each pair $(x_k, y_k)$ may depend on the vector of system parameters θ. System 110 mitigates the uncertainty 152 in the vector of parameters θ (i.e., in $\mathcal{D}=\{x_k(\theta), y_k(\theta)\}$). The detection of a negative change of device 130, such as a failure of a component of device 130, can be represented based on ML-based classifier 184. Such a structural change can be represented as:

$$s = f_c(s, u; \theta) \qquad (1)$$

and $$z = h_c(s, u; \theta), \qquad (2)$$

where c=1, ..., C, with C indicating the number of changes to device 130. Here, $M_i \in \{1, 2, \ldots, C\}$ represents the target modes of operations C of device 130. A target mode of operation can correspond to a set of parameters for which system 110 intends to determine a set of outputs. Such a target mode can represent a failure scenario for device 130. By augmenting system model 134 to incorporate the failure modes, training system 110 can generate augmented system model 135.

Figure 2A:
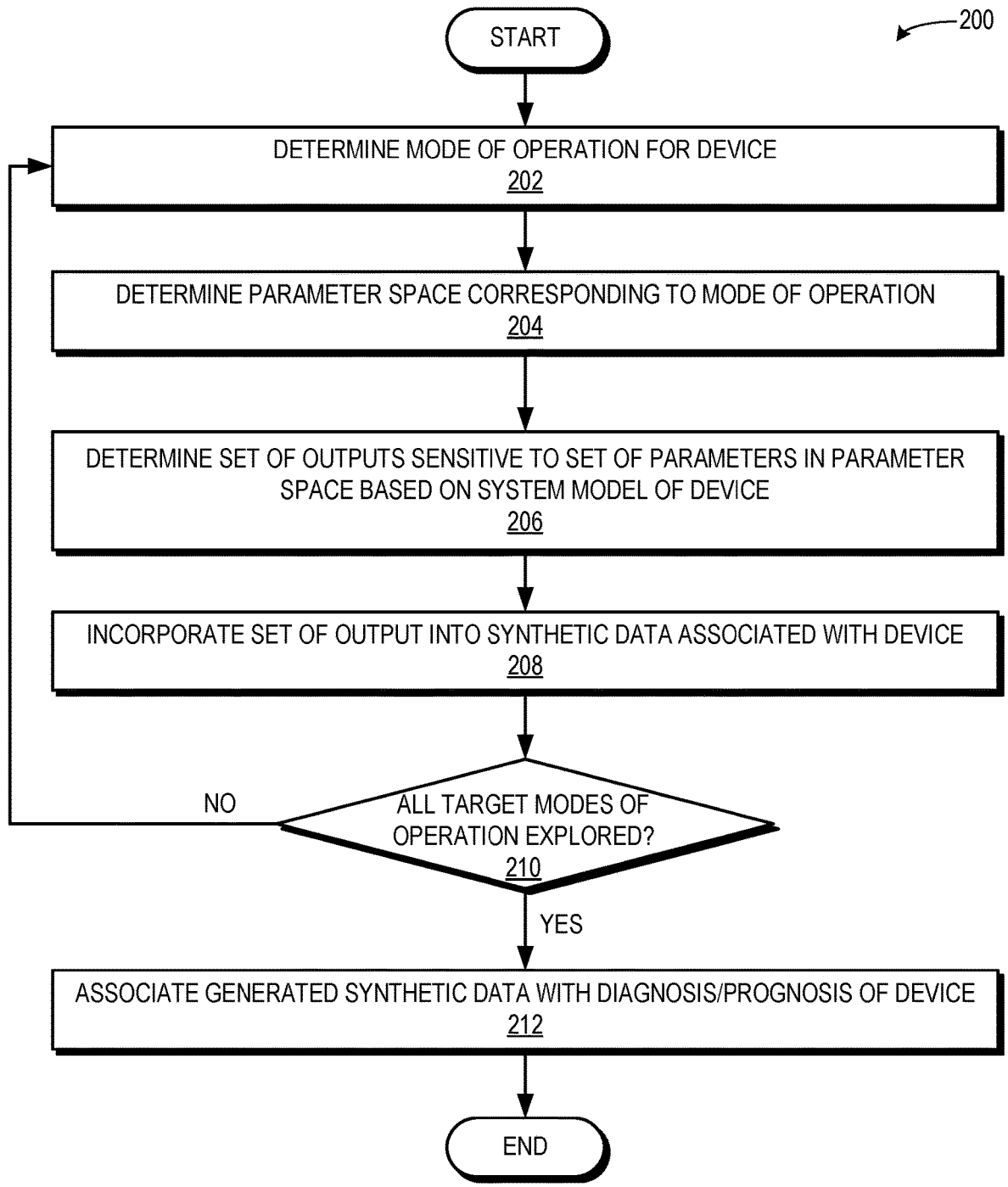
FIG. 2A presents a flowchart illustrating a method of a training system generating synthetic data for a prognostics engine, in accordance with an embodiment described herein.

FIG. 2A presents a flowchart 200 illustrating a method of a training system generating synthetic data for a prognostics engine, in accordance with an embodiment described herein. During operation, the system determines a mode of operation (e.g., C) for a device (operation 202) and a parameter space (e.g., θ) corresponding to the mode of operation (operation 204). The model of operation can represent a failure scenario of a device. The system determines a set of outputs sensitive to the set of parameters in the parameter space based on a system model of the device (operation 206) and incorporates the set of outputs into synthetic data associated with the device (operation 208). The system then checks whether all target modes of operation (e.g., $M_i$) have been explored (operation 210). If all target modes of operation have not been explored, the system determines the next mode of operation for the device (operation 202). Otherwise, the system associates the generated synthetic data with the prognosis (or diagnosis) of the device (operation 212).

Figure 2B:
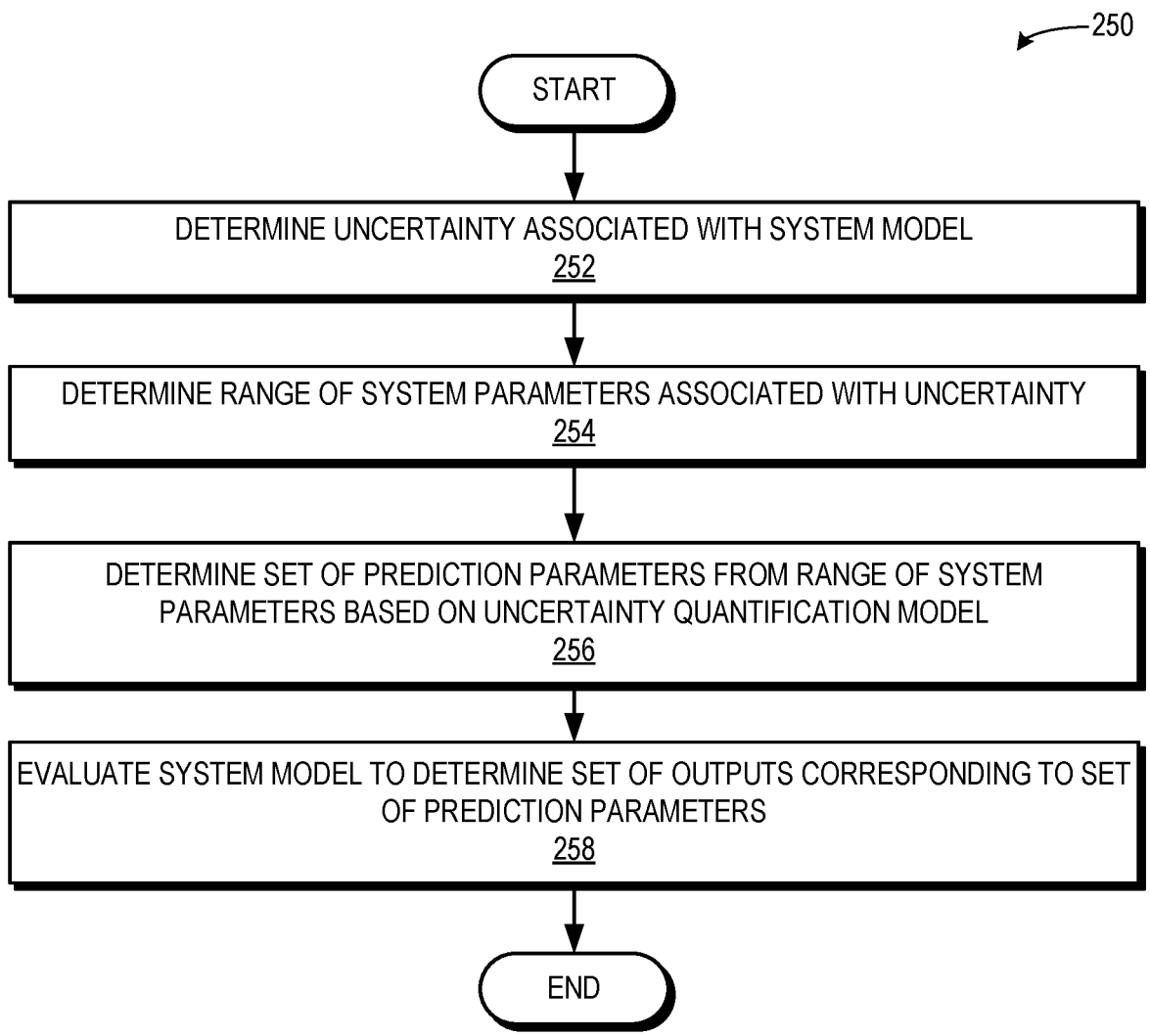
FIG. 2B presents a flowchart illustrating a method of a training system accounting for uncertainty in synthetic data using an uncertainty quantification model, in accordance with an embodiment described herein.

FIG. 2B presents a flowchart 250 illustrating a method of a training system accounting for uncertainty in synthetic data using an uncertainty quantification model, in accordance with an embodiment described herein. The operations in FIG. 2B correspond to operation 206 of FIG. 2A. During operation, the system determines uncertainty associated with the system model (operation 252) and a range of system parameters (e.g., θ) associated with the uncertainty (operation 254). The system then determines a set of prediction parameters (e.g., β) from the range of parameters based on an uncertainty quantification model (e.g., gPC and Monte-Carlo) (operation 256). The system evaluates (or simulates) the system model to determine a set of outputs (e.g., $y_k(\theta)$) corresponding to the set of prediction parameters (e.g., the inputs to the system model) (operation 258).

Uncertainty Quantification-Based Model Training

To utilize an uncertainty quantification model for $\mathcal{D}=\{(x_k, y_k)\}$, system 110 determines a mapping y=g(x; β) such that g $(x_k; \beta)$ and $y_k$ are close to each other with respect to some metric. For the optimization-based approach, β is computed by minimizing a sum of loss functions L(β; $x_k$, $y_k$) with respect to β. A respective loss function measures the discrepancy between the classifier's prediction and the output $y_k$ for the $k^{th}$ input (training feature). For example, in the case of linear regression, the loss function is a quadratic function L(β; $x_k$, $y_k$)=$\|y_k - \beta^T x_k\|^2$. A loss function can also be non-linear (e.g., logistic regression).

The parameter vector β is derived by solving the following optimization problem $$\hat{\beta} = \operatorname*{argmin}_{\beta} \mathcal{L}(\beta; \mathcal{D}), \qquad (3)$$

where $$\mathcal{L}(\beta; \mathcal{D}) = \frac{1}{|\mathcal{D}|} \sum_{k=1}^{|\mathcal{D}|} L(\beta; x_k, y_k) + \lambda R(\beta),$$

|·| denotes the cardinality of a set, and R (β) is a regularization function weighted by the regularization parameter λ. It should be noted that, since the training data depends on θ and (and thus is stochastic), the cost function is stochastic as well. Hence, the optimization problem is reformulated by averaging over the values of θ:

$$\hat{\beta} = \arg\min_{\beta} \mathbb{E}_\theta[\mathcal{L}(\beta; \mathcal{D}(\theta))], \qquad (4)$$

where the expectation is taken with respect to the distribution of θ. To evaluate Equation (4), system 110 can evaluate $\mathbb{E}_\theta[\mathcal{L}(\beta; \mathcal{D}(\theta))] = \int \mathcal{L}(\beta; \mathcal{D}(\theta))dP_\theta$, where $dP_\theta$ is the probability measure of θ. System 110 can use the uncertainty quantification model to determine an efficient way to approximate the expectation in Equation (4), which then can be solved either in closed form (in the case of linear regression), or using iterative algorithms, such as the gradient descent algorithm.

On the other hand, for the state-estimation approach, β can be estimated using Bayesian approaches. For example, system 110 can use a minimum mean square error (MMSE) estimator denoted by $\hat{\beta} = \mathbb{E}[\beta | \mathcal{D}]$, or a maximum likelihood estimator denoted by $$\hat{\beta} = \arg\max_{\beta} p(\beta | \mathcal{D}).$$

Both estimators can be expressed based on a state estimation problem where $\hat{\beta}$ can be a value of a filter-generated state estimate at iteration $\mathcal{D}$ denoted by $$\hat{\beta}_k = \mathbb{E}[\beta_k | \{(x_1, y_1), \ldots, (x_k, y_k)\}], \text{ or}$$

$$\hat{\beta}_k = \arg\max_{\beta_k} p(\beta_k | \{(x_1, y_1), \ldots, (x_k, y_k)\}).$$

Here, $\beta_k$ evolves according to a state space model. System 110 can then use one or more filtering algorithms, such as the Kalman filter or the particle filter, to determine β. System 110 can use an uncertainty quantification model to limit the number of evaluations of system model 135 when learning parameters 160.

If $X=(x_k)$ and $Y=(y_k)$ are the feature matrix and the column vector of outputs, respectively, training data 154 can be represented as a matrix $\mathcal{D}=[X, Y]$. If d is an entry of matrix $\mathcal{D}$, a corresponding gPC expansion of d is denoted by $d=\Sigma_{i=0}^{M} d_i \psi_i(\xi)$. Using the orthogonal property of the chaos polynomials, $d_i$ can be computed as:

$$d_i = \frac{1}{\|\psi_i^2\|} \langle d, \psi_i \rangle = \frac{1}{\|\psi_i^2\|} \int d(\xi)\psi_i(\xi)W(\xi)d\xi. \qquad (5)$$

The integral in the right hand side of Equation (5) can be approximated using Gauss-quadrature:

$$d_i = \frac{1}{\|\psi_i^2\|} \sum_{n=1}^{N} w_n d(\xi_n)\psi_i(\xi_n), \qquad (6)$$

which requires N evaluations of system model 135 for the set of collocation points $\{\xi_n\}_{n=1}^{N}$ with an associated set of weights $\{w_n\}_{n=1}^{N}$ that depends on the weight function W(ξ).

It should be noted that the evaluations of system model 135 can be executed in terms of the vector of parameters θ, which is expanded as: $\theta=\tau_{i=0}^{M}\theta_i\psi_i(\xi)$. The coefficients $\theta_i$ can follow the orthogonality property based on evaluations of a set of expectations in terms of θ and ξ. However, since θ and ξ may belong to different probability spaces with different event spaces and σ-algebras, they are mapped on the same probability space by applying a measure transformation. Therefore, θ and ξ are represented as a function of a new random variable. For a scalar case, if $dF_\theta(\theta)$ and $dF_\xi(\xi)$ are the probability measures of θ and ξ, respectively, a random variable U~$\mathcal{U}$ (0,1) can be defined and $du=dF_\theta(\theta)=dF_\xi(\xi)$ can be imposed. Since $dF_U=f(u)du=du$, du is the p.d.f. of U. This provides the transformations $\theta=F_\theta^{-1}(u)$ and $\xi=F_\xi^{-1}(u)$. Thus, the coefficients of the expansion $\theta=\Sigma_{i=0}^{M}\theta_i\psi_i(\xi)$ can be determined as:

$$\theta_i = \frac{1}{\|\psi_i^2\|}\langle \theta, \psi_i(\xi) \rangle = \qquad (7)$$

$$\frac{1}{\|\psi_i^2\|}\int \theta\psi_i(\xi)dF_\xi(\xi) = \frac{1}{\|\psi_i^2\|}\int_0^1 F_\theta^{-1}(u)\psi_i(F_\xi^{-1}(u))du.$$

Based on the choice of distribution for U, Equation (7) can be approximated using Gauss-Legendre quadrature.

Optimization-Based Approach

Figure 3:
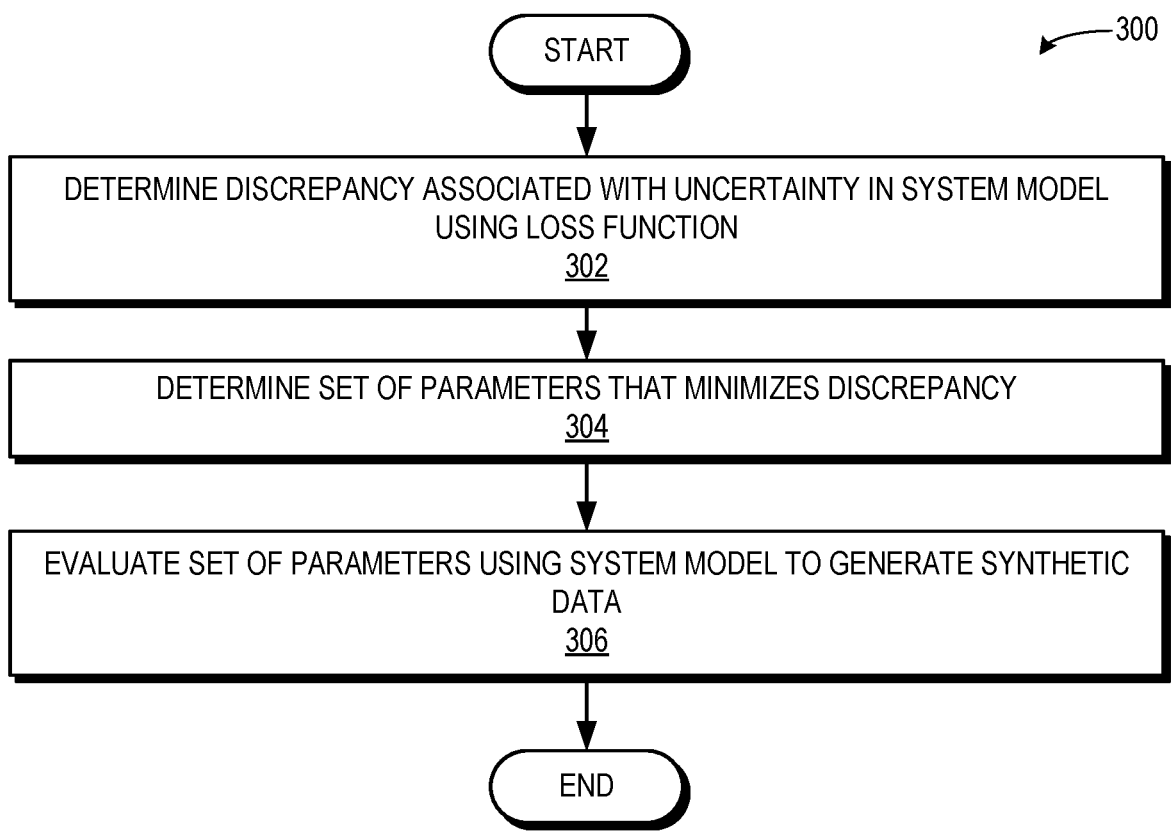
FIG. 3 presents a flowchart illustrating a method of a training system using an optimization-based approach for accounting for uncertainty in synthetic data, in accordance with an embodiment described herein.

FIG. 3 presents a flowchart 300 illustrating a method of a training system using an optimization-based approach for accounting for uncertainty in synthetic data, in accordance with an embodiment described herein. During operation, the system determines a discrepancy associated with the uncertainty in the system model using a loss function (operation 302). The system then determines a set of parameters that minimizes the discrepancy (operation 304) and evaluates the set of parameters using the system model to generate the synthetic data (operation 304).

To efficiently evaluate Equation (4), the system can use the gPC expansion of θ to express:

$$\hat{\beta} = \arg\min_{\beta} \mathbb{E}_\theta[\mathcal{L}(\beta; \mathcal{D}(\theta))] \qquad (8)$$

in terms of ξ and obtain:

$$\hat{\beta} = \arg\min_{\beta} \mathbb{E}_\xi[\mathcal{L}(\beta; \mathcal{D}(\xi))]. \qquad (9)$$

Using chaos Gauss-quadrature methods for efficiently computing expectations over the distribution of ξ, $\hat{\beta}$ can be obtained as:

$$\hat{\beta} = \arg\min_{\beta} \sum_{n=1}^{N} w_n \mathcal{L}(\beta; \mathcal{D}(\xi_n))). \qquad (10)$$

Therefore, to evaluate Equation (8), the system may execute N evaluations of the system model (e.g., system model 135 for device 130) at each point of the input parameters $\{\xi_n\}_{n=1}^{N}$. The system can then use an optimization algorithm to compute $\hat{\beta}$.

In the case of linear regression with quadratic cost function, Equation (10) can be expressed as $\hat{\beta}=(\Sigma_{n=1}^{N}w_{n}X_{n}^{T}X_{n})^{-1}(\Sigma_{n=1}^{N}w_{n}X_{n}^{T}Y_{n})$, where $X_{n}=(x_{k,n})$ and $Y_{n}=(Y_{k,n})$ are the feature matrix (i.e., the input parameters corresponding to features of device 130) and the output vector that results from evaluating system model 135 at $\xi_{n}$, respectively. More generally, a gradient descent algorithm that evaluates Equation (10), at least locally, is denoted by:

$$\hat{\beta} \leftarrow \hat{\beta} - \alpha \sum_{n=1}^{N} w_{n} \nabla_{\beta} \mathcal{L}(\hat{\beta}; \mathcal{D}(\xi_{n})), \quad (11)$$

where α is the iteration step size (e.g., time-varying step size). This may require the evaluation of the gradient of $\mathcal{L}$ at each parameter $\xi_{n}$.

State Estimation Approach

In some embodiments, the ML-based classifier 184 can be represented using uncertainty-aware filters for estimating the parameters of the prediction model (e.g., ML-based classifier 184) by interpreting the parameters as states. Here, the learning operations of ML-based classifier 184 can be transformed to a state estimation problem. Since the input features and the outputs of the training data 154 are related by the map $y_k=g(x_k;\beta)$ system 110 can determine training data 154, $\mathcal{D}=\{(x_k,y_k)\}$ as a sequence of observations over time, with k denoting the discrete time index. In addition, $g(x_k;\beta)$ can be considered as a time-varying observation model $h_k(\beta)=g(x_k;\beta)$ that provides indirect information about β (i.e., $y_k=h_k(\beta)$). Based on the dependence on $\xi$ of training data 154, the regression model can be represented as:

$$\beta_{k+1}=\beta_k, \quad (12)$$

and $$Y_k(\xi)=h_k(\beta_k,\xi). \quad (13)$$

Since $y_k=\Sigma_{i=0}^{M}y_{k,i}\psi_i(\xi)$, the state space model can become $\beta_{k+1}=\beta_k$ and $Z_k=h_k(\beta_k,\xi)=\Sigma_{i=1}^{M}y_{k,i}\psi_i(\xi)$. System 110 then computes a state estimate $\hat{\beta}_k$ that converges to the unknown state $\beta_k$.

Figure 4A:
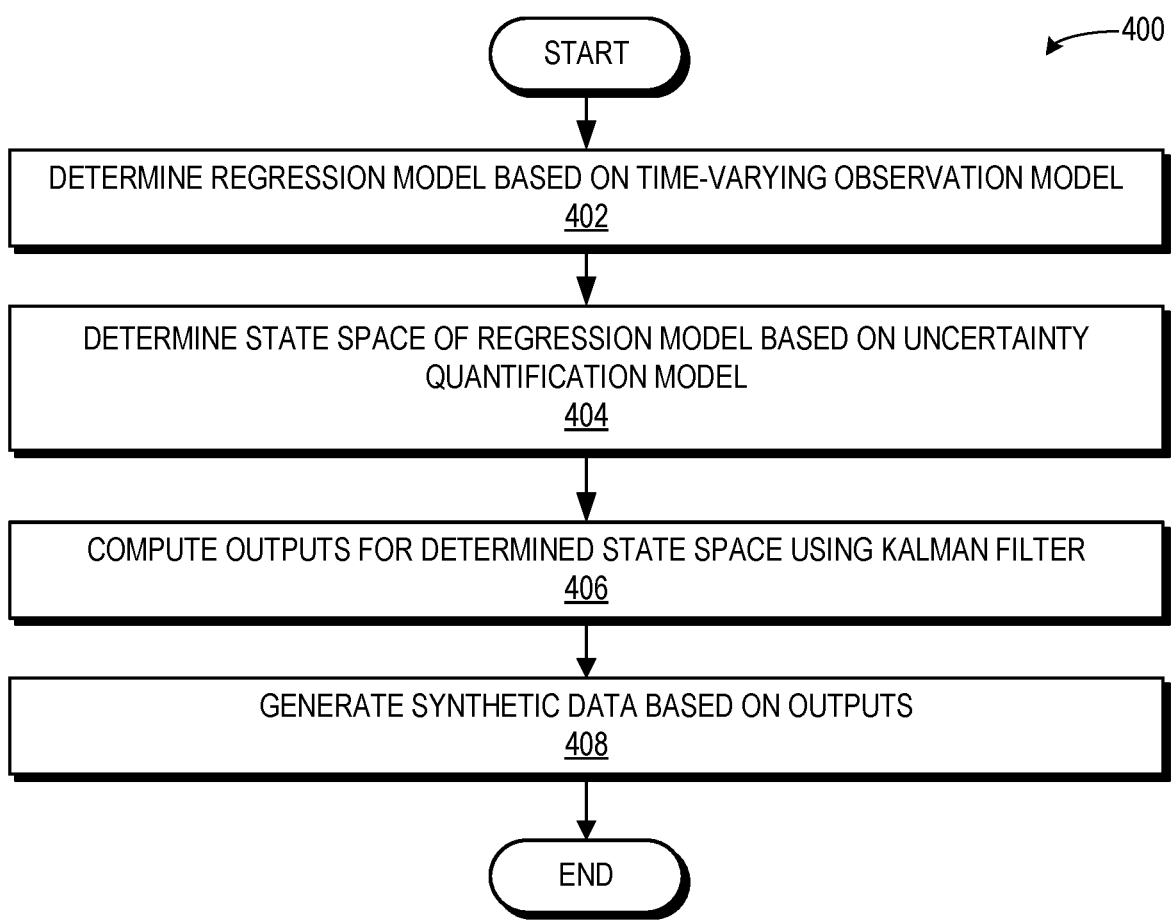
FIG. 4A presents a flowchart illustrating a method of a training system using a Kalman filter of state-estimation-based approach for accounting for uncertainty in synthetic data, in accordance with an embodiment described herein.

FIG. 4A presents a flowchart 400 illustrating a method of a training system using a Kalman filter of state-estimation-based approach for accounting for uncertainty in synthetic data, in accordance with an embodiment described herein. During operation, the system determines a regression model based on a time-varying observation model (operation 402) and determines the state space of the regression model based on an uncertainty quantification model (operation 404). The system then computes the outputs for the determined state space using a Kalman filter (operation 406) and generates synthetic data based on the outputs (operation 408).

To efficiently use the Kalman filter, the system can use the gPC expansions of β, and of the output and the feature vector in the state space described in Equations (12)-(13). Based on the expansion $\beta_k=\Sigma_{i=0}^{M}\beta_{k,i}\psi_i(\xi)$, the state space representation becomes $\Sigma_{i=0}^{M}\beta_{k+1,i}\psi_i(\xi)=\Sigma_{i=0}^{M}\beta_{k,i}\psi_i(\xi)$ and $\Sigma_{i=0}^{M}y_{k,i}\psi_i(\xi)=(\Sigma_{i=0}^{M}x_{k,i}^{T}\psi_i(\xi))(\Sigma_{i=0}^{M}\beta_{k,j}\psi_j(\xi))$. Using the orthogonality property of the chaos polynomials, the following set of coupled difference equations can be obtained: $\beta_{k+1,i}=\beta_{k,i}$ and $Y_{k,i}=\Sigma_{j=0}^{M}C_{k,i,j}\beta_{k,j}$, where $$C_{k,ij}=\frac{1}{\|\psi_i\|^2}\sum_{l=0}^{M}\langle\psi_l,\psi_i\psi_j\rangle x_{k,l}^{T}.$$

They can be compactly represented as $\bar{\beta}_{k+1}=\bar{\beta}_k$ and $\bar{y}_k=\bar{C}_k\bar{\beta}_k+\bar{v}_k$, where $\bar{\beta}_k^T=[\beta_{k,0},\ldots,\beta_{k,M}]$, $\bar{y}_k^T=[y_{k,0},\ldots,y_{k,M}]$, and $\bar{C}_k=(C_{k,ij})$. If $\bar{\beta}_0$ is Gaussian, using Gaussian noise $\bar{v}_k$, the system can use the Kalman filter to compute the state estimate $$\hat{\bar{\beta}}_k^T=[\hat{\beta}_{k,0},\ldots,\hat{\beta}_{k,M}].$$

Finally, the state estimate $\beta_k$ can be denoted by $\hat{\beta}_k=\hat{\beta}_{k,0}$.

Figure 4B:
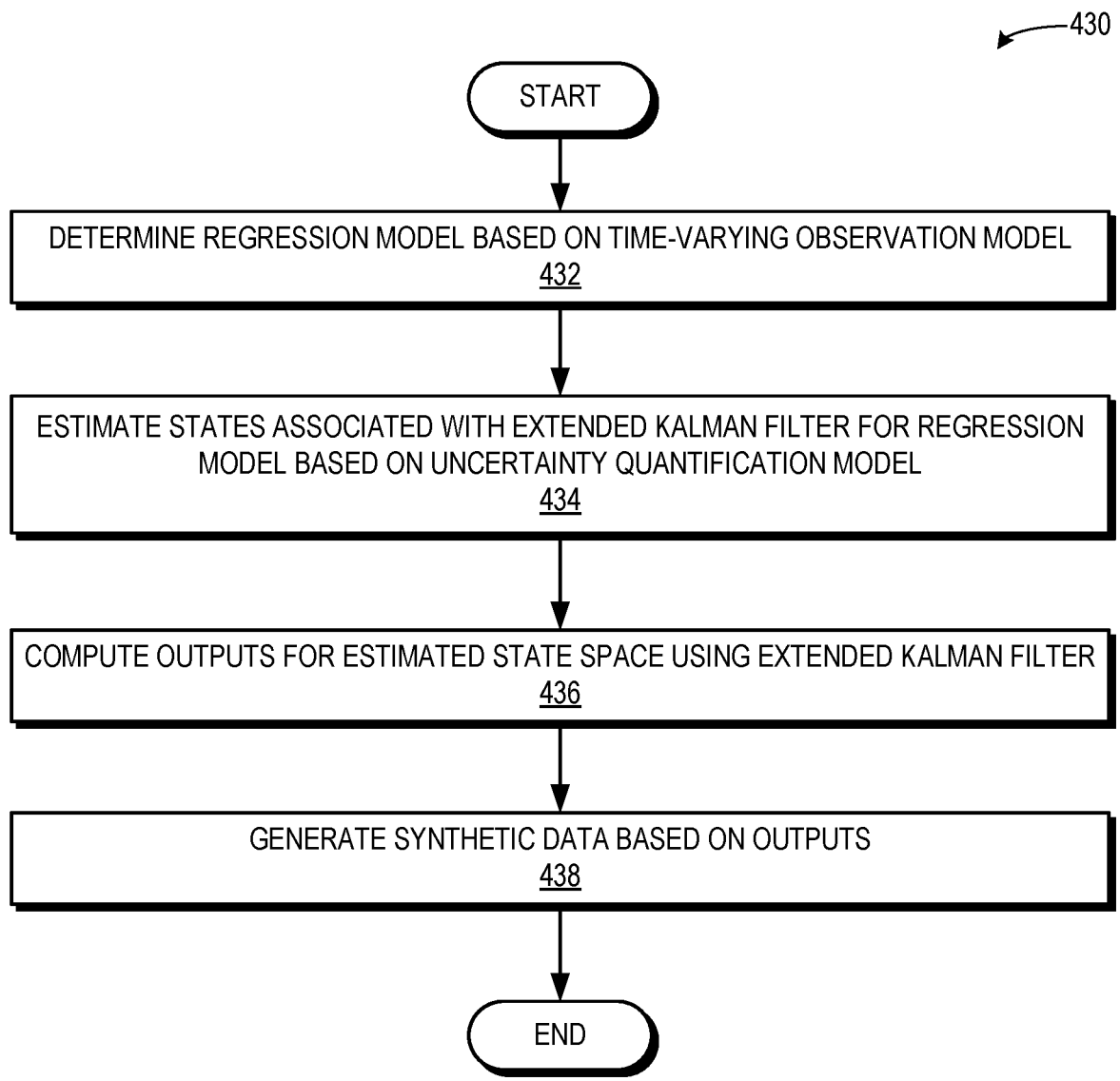
FIG. 4B presents a flowchart illustrating a method of a training system using an extended Kalman filter of state-estimation-based approach for accounting for uncertainty in synthetic data, in accordance with an embodiment described herein.

It should be noted that the Kalman filter can be efficient for the linear Gaussian systems. However, there are state estimation filters that accommodate non-linear state space models and non-Gaussian noise, such as the extended Kalman filter. FIG. 4B presents a flowchart 430 illustrating a method of a training system using an extended Kalman filter of state-estimation-based approach for accounting for uncertainty in synthetic data, in accordance with an embodiment described herein. During operation, the system determines a regression model based on a time-varying observation model (operation 432). The system estimates the states associated with an extended Kalman filter for the regression model based on an uncertainty quantification model (operation 434). The system then computes the outputs for the determined state space using the extended Kalman filter (operation 436) and generates synthetic data based on the outputs (operation 438).

Suppose that the output is not explicitly dependent on the random variable $\xi$. The output then depends on the structure of the device rather than the parameters. If $\xi$ is a state whose distribution remains constant, the corresponding state space model is denoted by $\beta_{k+1}=\beta_k$, and $\xi_{k+1}=\xi_k$, where $h_k(\beta_k,\xi_k)=g(x_k,\beta_k)=g(\Sigma_{i=0}^{M}x_{k,i}\psi_i(\xi_k),\beta_k)$. The system then can use the Hermite gPC expansion, $\xi_0\sim\mathcal{N}(0,1)$. If $\beta_0$ is Gaussian, using Gaussian noise $v_k\sim\mathcal{N}(0,\varepsilon I)$, the system can use the extended Kalman filter to compute the state estimate as $$\hat{\beta}_{k+1}=\hat{\beta}_k+L_k^{\beta}\left(y_k-g\left(\sum_{i=0}^{M}x_{k,i}\psi_i(\hat{\xi}_k),\hat{\beta}_k\right)\right) \text{ and}$$

$$\hat{\xi}_{k+1}=\hat{\xi}_k+L_k^{\xi}\left(y_k-g\left(\sum_{i=0}^{M}x_{k,i}\psi_i(\hat{\xi}_k),\hat{\beta}_k\right)\right), \text{ where}$$

$$L_k^T=[(L_k^{\beta})^T,(L_k^{\xi})^T], C_k=\left[\frac{\partial g}{\partial \beta}\Big|_{\hat{\beta}_k,\hat{\xi}_k},\frac{\partial g}{\partial \xi}\Big|_{\hat{\beta}_k,\hat{\xi}_k}\right],$$

$$L_k=P_kC_k^TS_k^{-1}, S_k=C_kP_kC_k^T+\varepsilon I, \text{ and}$$

$$P_{k+1}=(I-L_kC_k)P_k.$$

The Jacobian of g with respect to β and $\xi$ can be computed offline, and hence the numerical effort for implementing the filter is focused on inverting $S_k$.

Figure 4C:
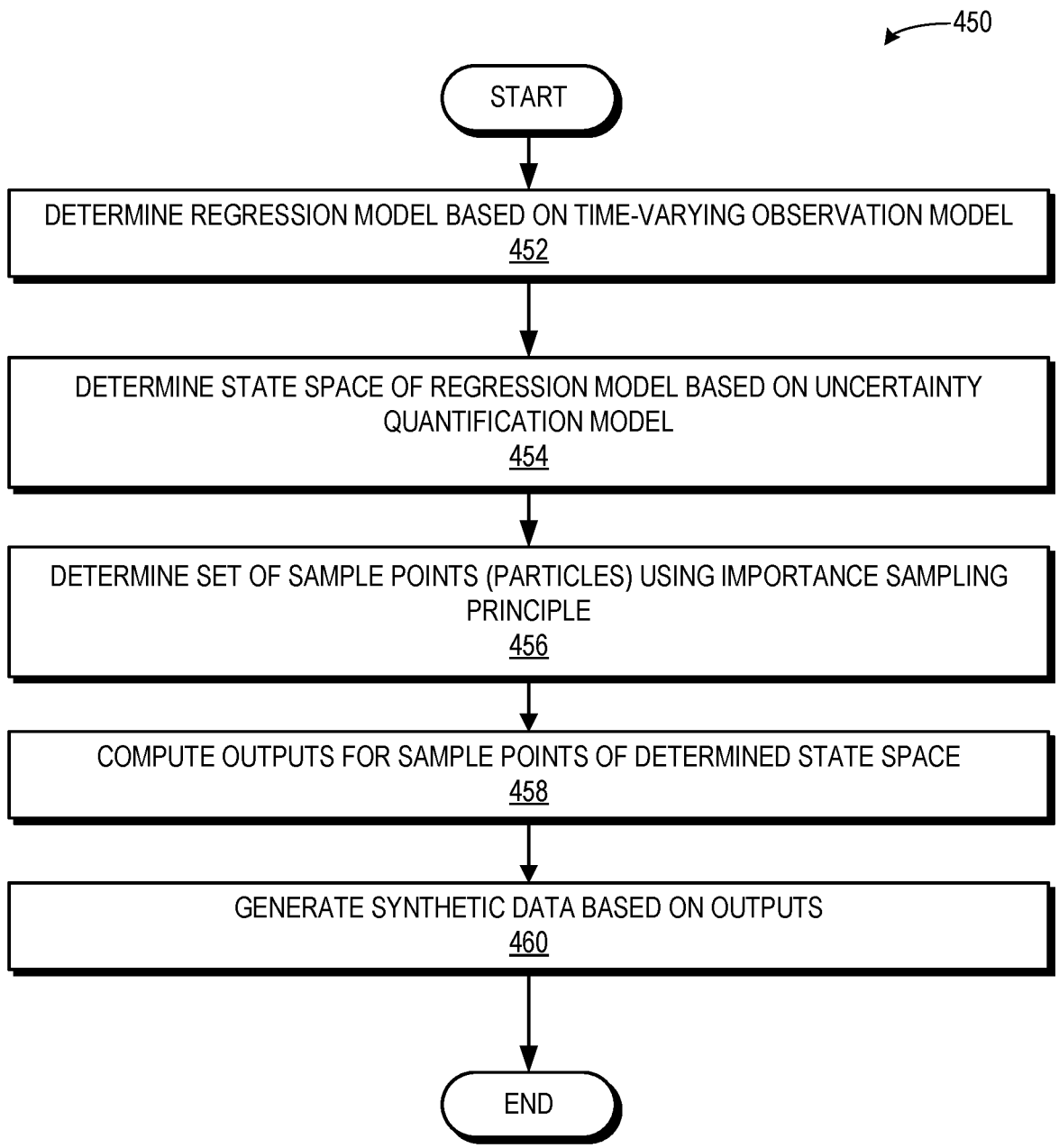
FIG. 4C presents a flowchart illustrating a method of a training system using a particle filter of state-estimationbased approach for accounting for uncertainty in synthetic data, in accordance with an embodiment described herein.

Another are state estimation filter that accommodates non-linear state space models and non-Gaussian noise is the particle filter. FIG. 4C presents a flowchart 450 illustrating a method of a training system using a particle filter of state-estimation-based approach for accounting for uncertainty in synthetic data, in accordance with an embodiment described herein. During operation, the system determines a regression model based on a time-varying observation model (operation 452) and determines the state space of the regression model based on an uncertainty quantification model (operation 454). The system then determines a set of sample points, which can be referred to as particles, using the importance sampling principle (operation 456). The system computes the outputs for the sample points of the determined state space (operation 458) and generates synthetic data based on the outputs (operation 460).

If $\xi$ is part of the unknown state and there is no restriction on the dependence of $y_k$ on $\xi$, the state-space representation can be denoted by:

$$\beta_{k+1} = \beta_k, \tag{14}$$

$$\xi_{k+1} = \xi_k, \tag{15}$$

and $$z_k = h_k(\beta_k, \xi_k) - \Sigma_{i=1}^{M} y_{k,i} \psi_i(\xi_k) + v_k, \tag{16}$$

where $Z_k = y_{k,0}$, $y_k(\xi) = \Sigma_{i=0}^{M} y_{k,i} \psi_i(\xi_k)$, and $v_k$ is a zero-mean Gaussian noise with covariance matrix $\varepsilon I$ for a small positive scalar $\varepsilon$. The system can use the particle filter to approximate the p.d.f. $p(\beta_k, \xi_k | z_{0:k})$ using a set of sample points, $\{\beta_{k,n}, \xi_{k,n}\}$, which can be referred to as particles.

Since $p(\beta_k, \xi_k | z_{0:k})$ may not be available, the system can use the importance sampling principle. This principle indicates that $p(\beta_k, \xi_k | z_{0:k})$ is approximated using samples drawn from a proposal distribution $q(\beta_k, \xi_k | z_{0:k})$ (e.g., a distribution that can be constructed). A weight associated with each particle is then updated using the output measurements, wherein the conditional p.d.f. of the state is expressed as: $p(\beta_k, \xi_k | z_{0:k}) = \Sigma_{n=1}^{N} w_{k,n} \delta([\beta_k, \xi_k] - [\beta k, n, \xi k, n])$, with wk,n as the weight associated to the nth particle. The corresponding MMSE is denoted by $\hat{\beta}_k = \Sigma_{n=1}^{N} w_{k,n} \beta_{k,n}$.

The system can use the particle filter for non-linear state space representations with non-Gaussian noise. The convergence of the state estimate is a function of the number of particles but not the size of the state vector. Under its simplest form, the structure of the particle filter can be represented by $$\beta_{k+1,n} = \beta_{k,n}, \xi_{k+1,n} = \xi_{k,n},$$

$$w_{k+1,n} = w_{k,n} p(z_{k+1} | \beta_{k+1,n}, \xi_{k+1,n}), \text{ and}$$

$$w_{k+1,n} = \frac{w_{k+1,n}}{\sum_{i=1}^{N} w_{k+1,i}}, \text{ where}$$

$$p(z_{k+1} | \beta_{k+1,n}, \xi_{k+1,n}) \sim \mathcal{N}(z_k - h_k(\beta_{k+1,n}, \xi_{k+1,n}), \varepsilon I).$$

When the system uses the particle filter, after a number of iterations, a significant number of weights can become small. The system can detect this phenomenon, which is referred to as degeneracy, using the effective sample size $$N_{\text{eff}} \approx \frac{N_s}{\sum_{n=1}^{N_s} (w_{k,n}^2)}.$$

If the effective sample size becomes less than a threshold value (e.g., a value provided to the system by an administrator), the system initiates a resampling operation. To do so, the system eliminates the particles with small weights and uses the particles with large weights. The resampling operation includes generating a new set of particles from the original one by resampling $N_s$ times such that the new sample is independent and identically distributed based on the discrete density $\Sigma_{n=1}^{N_s} w_{k,n} \delta([\beta_{k,n}, \xi_{k,n}]) - [\beta_{k,n}, \xi_{k,n}])$ with $w_{k,n}$. In this way, the system resets the weights to $w_{k,n} = 1/N_s$. In some embodiments, the system can increase the exploratory direction of the algorithm by adding a process noise in the state estimation. Equation (14) then becomes $\beta_{k+1} = \beta_k + \omega_k$, where $\omega_k \sim \mathcal{N}(0, \varepsilon_\omega I)$. With this change, the particle filter algorithm is changed to updating $\beta_{k+1,n}$ by taking a sample the distribution $p(\beta_{k+1} | \beta_{k,n}) = \mathcal{N}(\beta_{k,n}, \varepsilon_\omega I)$.

ML-Based Classifier for Prognosis

Figure 5A:
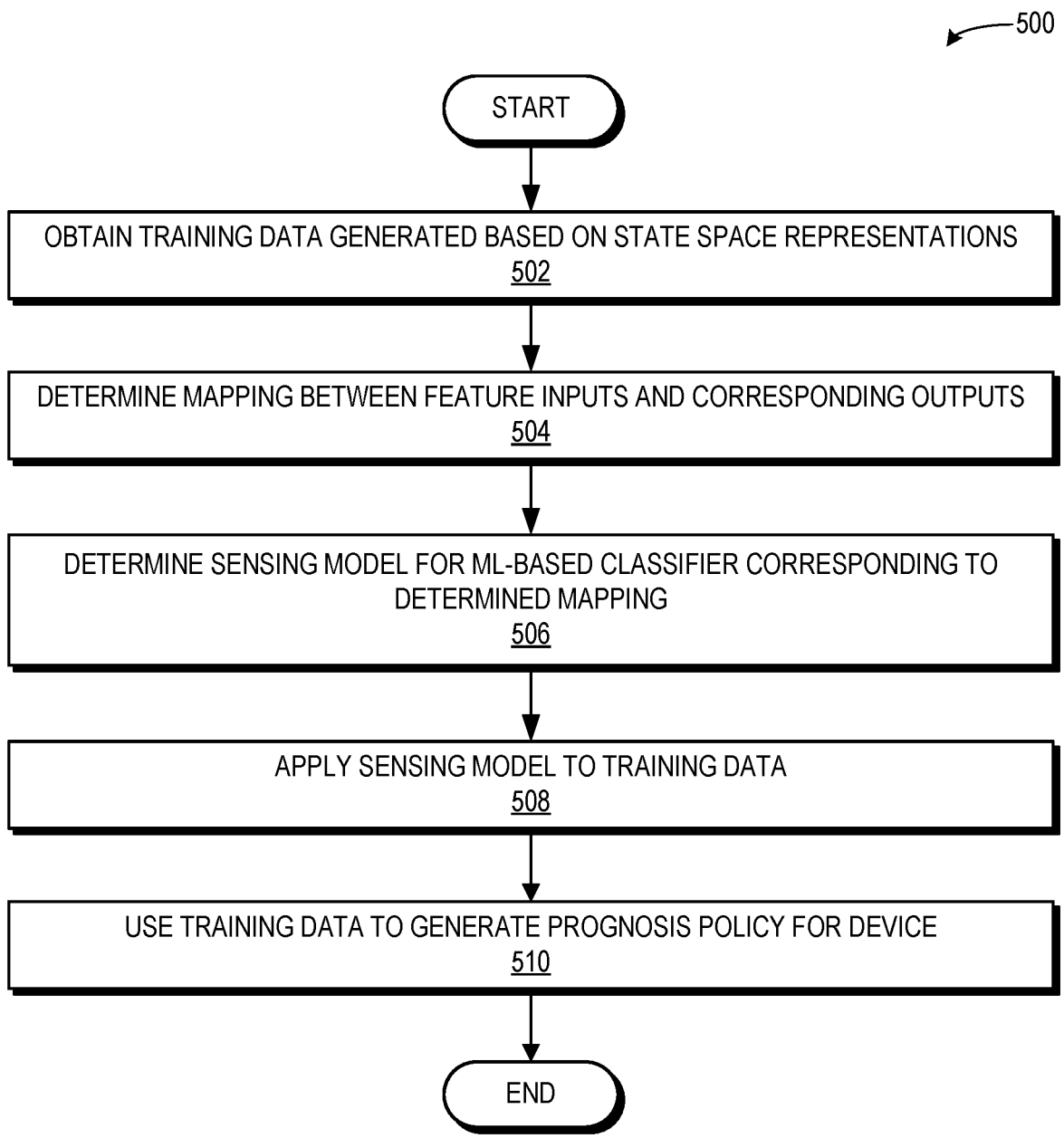
FIG. 5A presents a flowchart illustrating a method of a training system determining a prognosis policy for a device, in accordance with an embodiment described herein.

In some embodiments, based on the learned parameters, the training system may determine a prognosis policy and a corresponding control for a device. FIG. 5A presents a flowchart 500 illustrating a method of a training system determining prognosis policy for a device, in accordance with an embodiment described herein. During operation, the system obtains the training data generated based on state space representations (operation 502) and determines a mapping between the feature inputs (i.e., the feature vector) and the corresponding outputs (operation 504). The system determines a sensing model for the ML-based classifier corresponding to the determined mapping (operation 506). The system then applies the sensing model to the training data (operation 508). In some embodiments, the system can also use the training data to generate a prognosis policy for the device (operation 510).

The system can use the similar filters as in the case of the regression models for learning the parameters from a classifier. The system can adjust the sensing model to fit the classification problem. For example, the particle filter can be used for learning the parameters. Here, the outputs $y_k$ are independent of $\xi$ and belong to a finite set of categories $\mathcal{C} = \{1, 2, \ldots, C\}$. If $\{e_c\}_{c=1}^{C}$ is the standard Euclidean basis in $\mathbb{R}^C$ ($e_c$ is a vector of zeros, wherein $c^{th}$ entry is one), the classifier can be represented as the vector: $z_k = \Sigma_{c=1}^{C} \mathbb{1}(y_k = c) e_c$. Therefore, $z_k = e_c$ holds if $y_k = c$.

The mapping between the feature vector and the corresponding outputs can be denoted as:

$$z = \frac{1}{1 + \sum_{c=1}^{C-1} e^{\beta_c^T x}} \begin{bmatrix} e^{\beta_1^T x} \\ \vdots \\ e^{\beta_{C-1}^T x} \\ 1 \end{bmatrix} = g(x; \beta), \tag{17}$$

where the parameters (e.g., training data 154) of the ML-based classifier can be represented as $\beta^T = [\beta_1^T, \ldots, \beta_{C-1}^T]$. Similar to the regression model (e.g., Equations (12)-(13)), the sensing model for the classifier can be denoted by $z_k = h_k(\beta_k, \xi_k) = g(\Sigma_{i=0}^{M} x_{k,i} \psi_i(\xi_k); \beta_k)$. The system then can apply any filter for estimating $\beta$ that can indicate non-linear state space models.

Control Operations

Figure 5B:
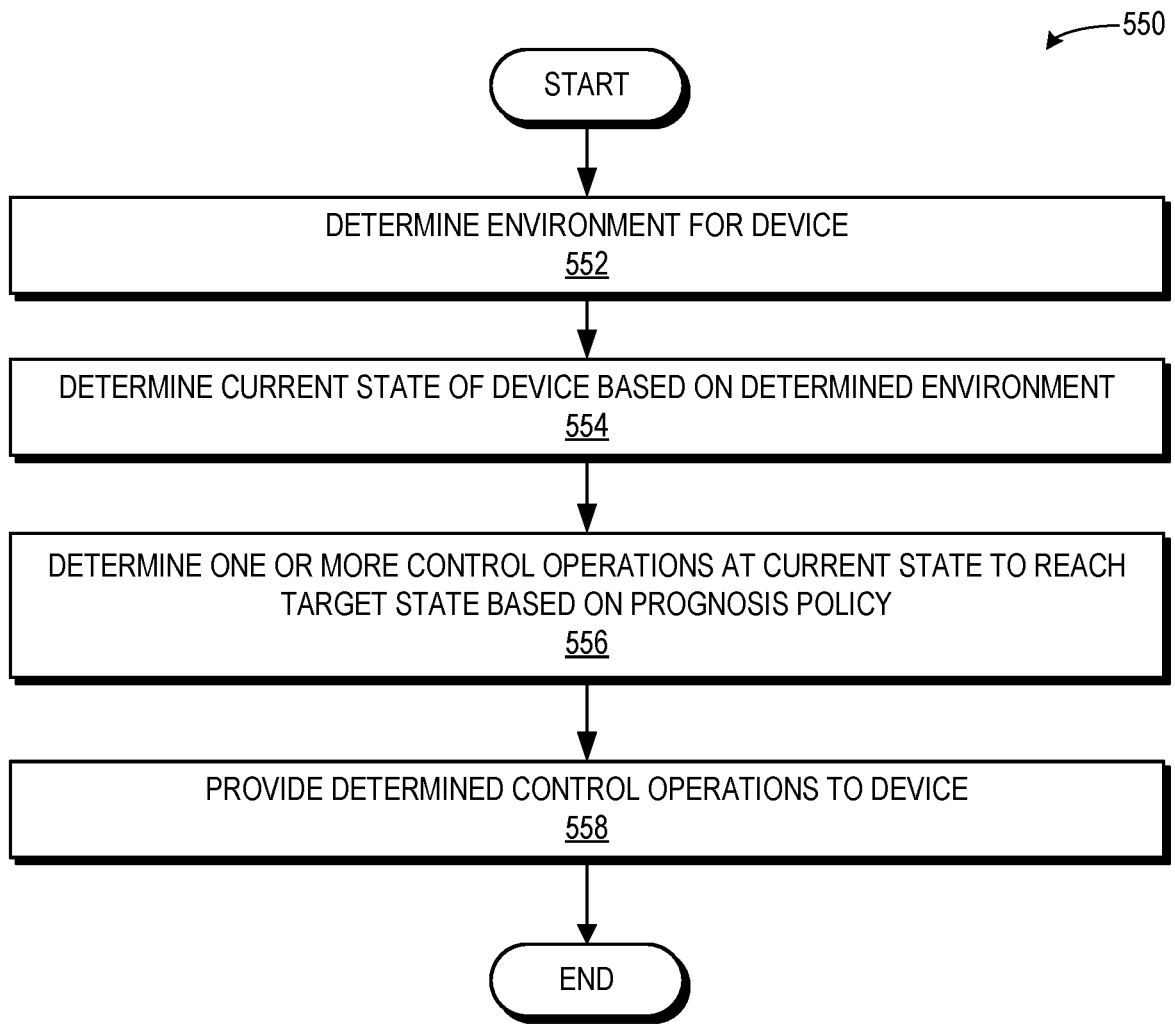
FIG. 5B presents a flowchart illustrating a method of a training system determining a control operation of a device, in accordance with an embodiment described herein.

FIG. 5B presents a flowchart 550 illustrating a method of a training system determining a control operation of a device, in accordance with an embodiment described herein. During operation, the training system determines an environment for the device (operation 552) and a current state of the device based on the determined environment (operation 554). The training system determines one or more control operations at the current state of the device to reach the target state based on the prognosis policy (operation 556). The training system provides the determined control operations to the device (operation 558).

Exemplary Computer and Communication System

Figure 6:
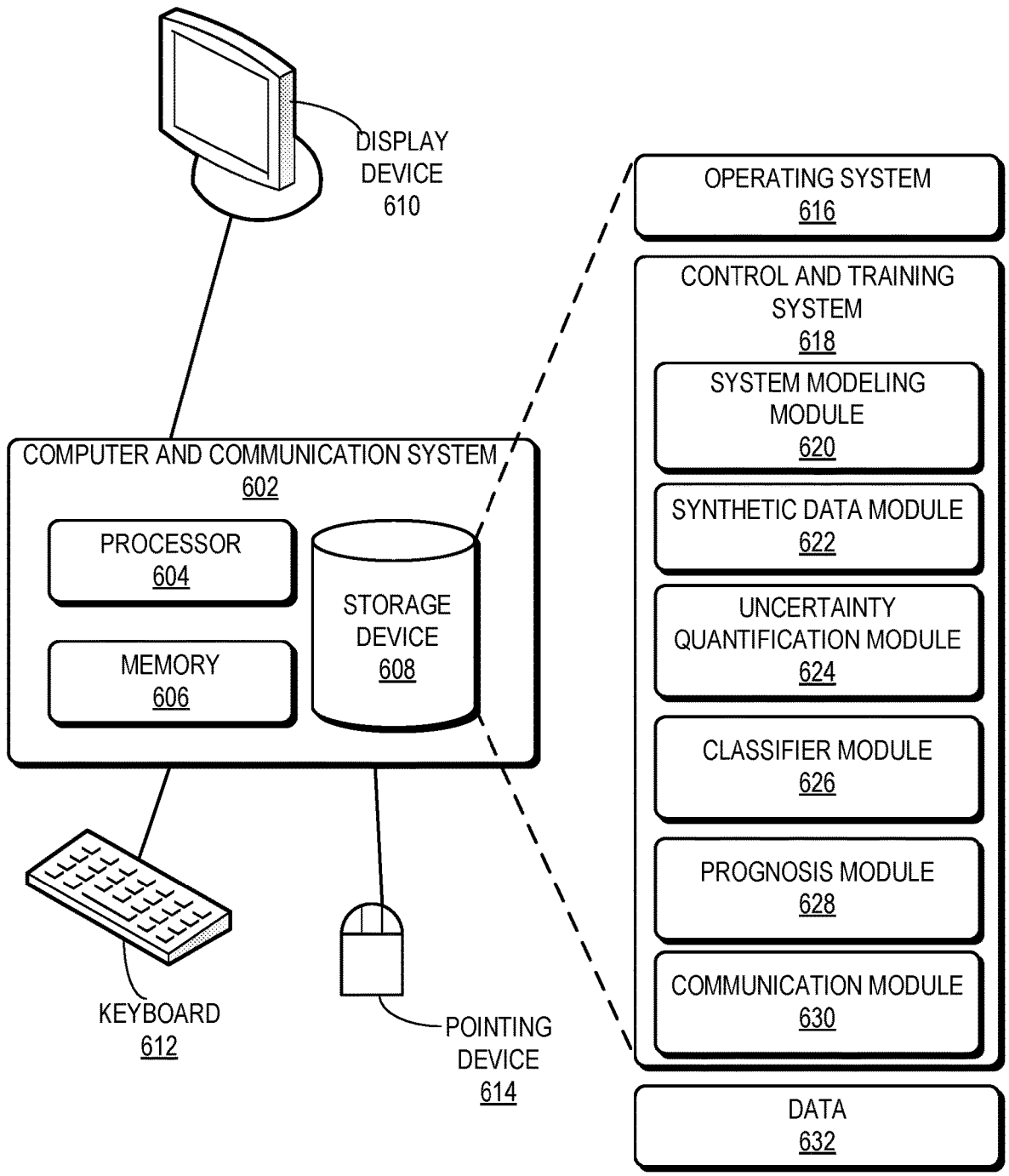
FIG. 6 illustrates an exemplary computer and communication system that facilitates a control and training system, in accordance with an embodiment described herein.

FIG. 6 illustrates an exemplary computer and communication system that facilitates a control and training system, in accordance with an embodiment described herein. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a control and training system 618, and data 632.

Here, control and training system 618 can represent control system 112 and/or training system 110, as described in conjunction with FIG. 1A. Control and training system 618 can include instructions, which when executed by computer and communication system 602, can cause computer and communication system 602 to perform the methods and/or processes described in this disclosure.

Control and training system 618 includes instructions for generating empirical data (e.g., based on experiments on a device) and determining a system model for the device based on the empirical data (system modeling module 620). Control and training system 618 further includes instructions for generating synthetic data based on the system model (synthetic data module 622). Control and training system 618 can include instructions for mitigating uncertainty in the synthetic data (e.g., using a gPC expansion) and generating training data (uncertainty quantification module 624).

Control and training system 618 can also include instructions for using an ML-based classifier on the training data to generate learned parameters (classifier module 626). Control and training system 618 can include instructions for determining prognosis information associated with the device based on the learned parameters (prognosis module 628). In some embodiments, control and training system 618 can also include instructions for generating control data for controlling the device based on the prognosis information (prognosis module 628). Control and training system 618 can further include instructions for exchanging information with the device and/or other devices (communication module 630).

Data 632 can include any data that is required as input or that is generated as output by the methods and/or processes described in this disclosure. Data 632 can include one or more of: empirical data, synthetic data, training data, policy information, and prognosis information.

Figure 7:
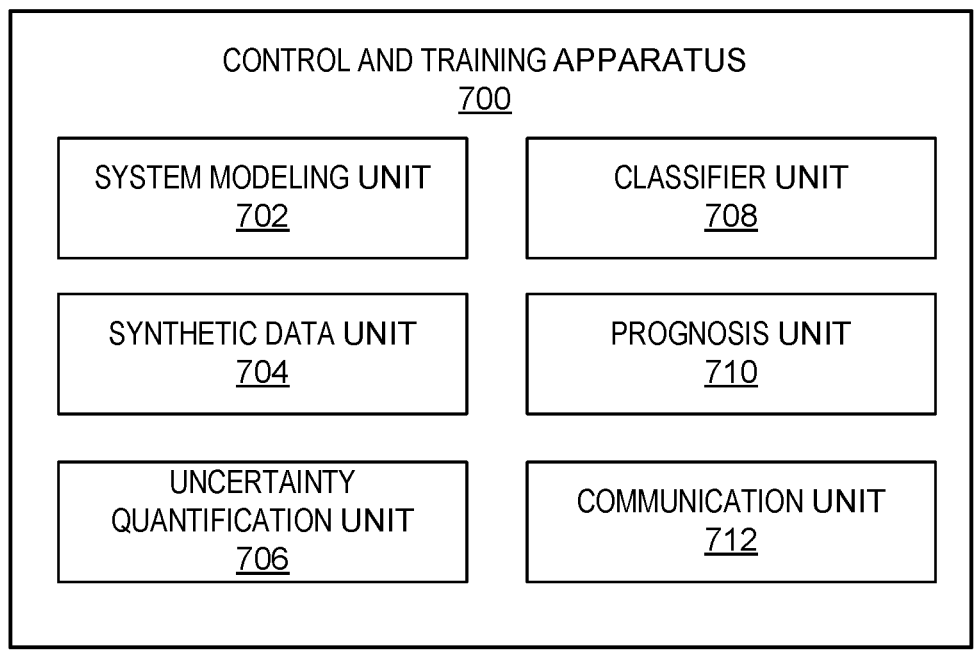
FIG. 7 illustrates an exemplary apparatus that facilitates a control and training system, in accordance with an embodiment of the present application.

FIG. 7 illustrates an exemplary apparatus that facilitates a control and training system, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to modules 720-730 of computer and communication system 602 of FIG. 6, including: a system modeling unit 702; a synthetic data unit 704; an uncertainty quantification unit 706; a classifier unit 708; a prognosis unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present disclosure described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a training system for a device, the method comprising:
determining, by a computer, a system model for the device based on empirical data of the device, wherein the empirical data is obtained based on experiments performed on the device, and wherein the system model outputs data that indicates how the device operates for a set of actions performed on the device;
generating synthetic data by applying, on the system model, one or more actions representing behavior of the device under a failure;
determining a range of parameters indicating uncertainty associated with the synthetic data;
determining a set of prediction parameters from the range of parameters using an uncertainty quantification model to reduce parameters associated with the uncertainty;
generating training data from the synthetic data based on the set of prediction parameters; and
learning a set of learned parameters for a prognosis of the device using a machine-learning-based classifier or a regression model on the training data.

2. The method of claim 1, wherein the uncertainty quantification model is based on generalized Polynomial Chaos (gPC) expansion.

3. The method of claim 1, wherein the machine-learning-based classifier is based on one or more of:
   an optimization of a set of input parameters to the system model; and
   a state estimation of the set of input parameters to the system model.

4. The method of claim 3, wherein the state estimation is based on a regression model using one or more of: a Kalman filter, an extended Kalman filter, and a particle filter.

5. The method of claim 1, wherein the reduction of parameters associated with the uncertainty mitigates uncertainty, which is indicated in the range of parameters, in the synthetic data by reducing computation overhead.

6. The method of claim 1, further comprising:
   determining a mode of operation of the device that represents the failure of the device; and
   determining the prediction parameters for the mode of operation.

7. The method of claim 1, further comprising:
   determining prognosis information for the prognosis of the device from the set of learned parameters; and
   determining a prognosis policy for the device based on the prognosis information.

8. The method of claim 1, further comprising:
   determining a current state of the device based on a current environment for the device, wherein the current environment corresponds to the failure of the device; and
   determining an operation corresponding to the current state based on the set of learned parameters.

9. A non-transitory computer-readable storage medium storing instructions that when executed by a computer cause the computer to perform a method for facilitating a training system for a device, the method comprising:
   determining a system model for the device based on empirical data of the device, wherein the empirical data is obtained based on experiments performed on the device, and wherein the system model outputs data that indicates how the device operates for a set of actions performed on the device;
   generating, from the system model, synthetic data by applying, on the system model, one or more actions representing behavior of the device under a failure;
   determining a range of parameters indicating uncertainty associated with the synthetic data;
   determining a set of prediction parameters from the range of parameters using an uncertainty quantification model to reduce parameters associated with the uncertainty;
   generating training data from the synthetic data based on the set of prediction parameters; and
   learning a set of learned parameters for a prognosis of the device using a machine-learning-based classifier or a regression model on the training data.

10. The computer-readable storage medium of claim 9, wherein the uncertainty quantification model is based on generalized Polynomial Chaos (gPC) expansion.

11. The computer-readable storage medium of claim 9, wherein the machine-learning-based classifier is based on one or more of:
   an optimization of a set of input parameters to the system model; and
   a state estimation of the set of input parameters to the system model.

12. The computer-readable storage medium of claim 11, wherein the state estimation is based on a regression model using one or more of: a Kalman filter, an extended Kalman filter, and a particle filter.

13. The computer-readable storage medium of claim 9, wherein the reduction of parameters associated with the uncertainty mitigates the uncertainty, which is indicated in the range of parameters, in the synthetic data by reducing computation overhead.

14. The computer-readable storage medium of claim 9, wherein the method further comprises:
   determining a mode of operation of the device that represents the failure of the device; and
   determining the prediction parameters for the mode of operation.

15. The computer-readable storage medium of claim 9, wherein the method further comprises:
   determining prognosis information for the prognosis of the device from the set of learned parameters; and
   determining a prognosis policy for the device based on the prognosis information.

16. The computer-readable storage medium of claim 9, wherein the method further comprises:
   determining a current state of the device based on a current environment for the device, wherein the current environment corresponds to the failure of the device; and
   determining an operation corresponding to the current state based on the set of learned parameters.

17. A computer system; comprising:
   a storage device;
   a processor; and
   a non-transitory computer-readable storage medium storing instructions, which when executed by the processor cause the processor to perform a method for facilitating a training system for a device, the method comprising:
      determining a system model for the device based on empirical data of the device, wherein the empirical data is obtained based on experiments performed on the device, and wherein the system model outputs data that indicates how the device operates for a set of actions performed on the device;
      generating, from the system model, synthetic data by applying, on the system model, one or more actions representing behavior of the device under a failure;
      determining a range of parameters indicating uncertainty associated with the synthetic data;
      determining a set of prediction parameters from the range of parameters using an uncertainty quantification model to reduce parameters associated with the uncertainty;
      generating training data from the synthetic data based on the set of prediction parameters; and
      learning a set of learned parameters for a prognosis of the device using a machine-learning-based classifier or a regression model on the training data.

18. The computer system of claim 17, wherein the uncertainty quantification model is based on generalized Polynomial Chaos (gPC) expansion; and
   wherein the machine-learning-based classifier is based on one or more of:
   an optimization of a set of input parameters to the system model; and
   a state estimation of the set of input parameters to the system model.

19. The computer system of claim 17, wherein the reduction of parameters associated with the uncertainty mitigates the uncertainty, which is indicated in the range of parameters, in the synthetic data by reducing computation overhead.

20. The computer system of claim 17, wherein the method further comprises:
  determining a mode of operation that represents the failure of the device; and
  determining the prediction parameters associated with the mode of operation.

* * * * *